United States Patent
Hu et al.

(10) Patent No.: US 8,916,645 B2
(45) Date of Patent: Dec. 23, 2014

(54) HYPERBRANCHED POLYMERS CONTAINING POLYHEDRAL OLIGOSILSEQUIOXANE BRANCHING UNITS

(75) Inventors: Jin Hu, Hudson, OH (US); Claire Hartmann-Thompson, Midland, MI (US); Dale J. Meier, Midland, MI (US); Petar R. Dvornic, Midland, MI (US)

(73) Assignee: Michigan Molecular Institute, Midland, MI (US)

( * ) Notice: Subject to any disclaimer, the term of this patent is extended or adjusted under 35 U.S.C. 154(b) by 73 days.

(21) Appl. No.: 13/521,582

(22) PCT Filed: Jan. 19, 2011

(86) PCT No.: PCT/US2011/021679
§ 371 (c)(1),
(2), (4) Date: Jul. 11, 2012

(87) PCT Pub. No.: WO2011/091010
PCT Pub. Date: Jul. 28, 2011

(65) Prior Publication Data
US 2012/0277372 A1     Nov. 1, 2012

Related U.S. Application Data

(60) Provisional application No. 61/336,202, filed on Jan. 19, 2010.

(51) Int. Cl.
C08G 77/18    (2006.01)
C07F 7/21     (2006.01)
C09J 183/06   (2006.01)
C08K 5/549    (2006.01)

(52) U.S. Cl.
CPC ............... G08G 77/04 (2013.01); C08K 5/549 (2013.01)
USPC ............................. 524/588; 528/32; 528/37

(58) Field of Classification Search
None
See application file for complete search history.

(56) References Cited

U.S. PATENT DOCUMENTS

| | | | | |
|---|---|---|---|---|
| 6,100,417 | A * | 8/2000 | Lichtenhan et al. | 556/460 |
| 6,384,172 | B1 * | 5/2002 | Dvornic et al. | 528/15 |
| 7,078,548 | B2 * | 7/2006 | Houser et al. | 556/431 |
| 7,144,453 | B2 * | 12/2006 | Yim et al. | 106/122 |
| 7,576,169 | B2 * | 8/2009 | Hasegawa et al. | 528/33 |
| 7,799,276 | B2 * | 9/2010 | Hartmann-Thompson | 422/83 |
| 8,076,427 | B2 * | 12/2011 | Gervasi et al. | 525/478 |
| 2006/0083925 | A1 * | 4/2006 | Laine et al. | 428/405 |
| 2006/0177748 | A1 | 8/2006 | Wu et al. | |
| 2006/0188732 | A1 | 8/2006 | Lichtenhan et al. | |
| 2009/0012317 | A1 * | 1/2009 | Laine et al. | 549/215 |

OTHER PUBLICATIONS

Miyasaka et al. "Synthesis and characterization of hyperbranched polymer consisting of silsesquioxane derivatives" Polymer Journal, 2010, 42, 799-803.*

(Continued)

*Primary Examiner* — Robert S Loewe
(74) *Attorney, Agent, or Firm* — Technology Law PLLC; Karen L. Kimble (57) ABSTRACT

The HBP Free-POSS compounds of Formula I are superior to prior HB polymers and linear polymers in space and electronic applications because they have better resistance to electrons, protons and atomic oxygen, have superior outgassing performance, and are transparent. They are used as coatings, films, adhesives, sealants and elastomers.

13 Claims, 7 Drawing Sheets

Formula IA (56) References Cited

OTHER PUBLICATIONS

Kolil-Veetil et al. "Hydrosilated Dendritic Networks of POSS Cores and Diacetylene Linkers" Macromolecules 2009, 42, 3992-4001.*
Kudo et al. "Synthesis of Polycarbosilanes by A2+Bn (n=2, 3, and 4) Type Hydrosilylation Reaction and Evaluation of Their Refractive Index Properties" Journal of Polymer Science: Part A: Polymer Chemistry, vol. 48, 5746-5751, 2010.*
Richard M. Laine "Nanobuilding blockes based on the [OSiO1.5]x (x=6, 8, 10) octasilsesquioxanes" J. Mater. Chem., 2005, 15, 3725-3744.*
Makoto Seino et al., Macromolecules 39, 8892-8894 (2006).

* cited by examiner

HYPERBRANCHED POLYMERS CONTAINING POLYHEDRAL OLIGOSILSEQUIOXANE BRANCHING UNITS

CROSS REFERENCE TO RELATED APPLICATIONS

This application claims priority from all the following listed applications and is a national phase 371 application from International Application PCT/US2011/021679, filed 19 Jan. 2011, which claims priority from U.S. Patent Application 61/336,202, filed 19 Jan. 2010.

FEDERALLY SPONSORED RESEARCH STATEMENT

This invention was made with Government support for "Radiation Resistant Elastomer Containing POSS, Phenylsiloxane and Ce(IV) Compositions for a Space Solar Cell Adhesive" under Award Nos. FA9453-09-C-0015 and FA9453-08-M-0010 from the US Air Force to Oxazogen, Inc. The Government has certain rights in this invention.

BACKGROUND OF THE INVENTION

1. Field of the Invention

This invention generally relates to hyperbranched polymers containing POSS as a branching monomer or backbone monomer component. These HB-POSS polymers are useful in coatings, films, adhesives and sealants.

2. Description of Related Art

The hyperbranched polymers described in U.S. Pat. No. 6,348,172 are hyperbranched polycarbosiloxanes. These polymers are made in an $A_x/B_y$ polymerization in U.S. Pat. No. 6,812,298. No hyperbranched polysiloxanes were taught. None of these hyperbranched polymers contain POSS.

Hyperbranched polymers have been crosslinked to fabricate crosslinked networks in U.S. Pat. Nos. 6,646,089; 6,995,215; and 7,446,155. None of these hyperbranched polymers or networks contains POSS.

Some hyperbranched polysiloxanes are reported in the literature (e.g., P. Dvornic, M. J. Owen, 'Silicon-Containing Dendritic Polymers', Springer, 2009, pg 414), but none containing POSS.

Using POSS as the core of a dendrimer is known (e.g., P. Dvornic, M. J. Owen, 'Silicon-Containing Dendritic Polymers', Chapter 7 'Polyhedral Oligosilsesquioxane Dendrimers', Springer, 2009). No use of the POSS elsewhere in a dendrimer was described.

POSS used as a pendant group on dendritic polysiloxanes are known [e.g., M. Seino, et al., *Macromolecules* 39, 8892 (2006)].

Dendritic polymers with terminal POSS groups are known [e.g., Chang, Y., et al., *Polym. Sci.* Part A: *Polym. Chem.* 41(23), 3726-3735 (2003)].

The use of POSS as a monomer in an $A_x/B_y$ polymerization reaction has been described by: 1) Kolel-Veetil, et al., *J. Polym. Sci.* Part A: *Polym. Chem.* 46(7), 2581-2587 (2008) where vinyl-terminated carboranylenesiloxane ($B_2$) was reacted with octasilane POSS ($A_8$) in a Karstedt catalyzed hydrosilylation to give a dendritic network containing POSS and carborane clusters. This is a network, not a free/soluble hyperbranched polymer; and 2) Wada, K., et al., *Chem. Commun.* 95-97 (2005) where a low generation dendrimer (not a hyperbranched polymer) was made using octakis(dimethylsiloxy)silsesquioxane and alkenylsilyl-functionalized silsesquioxane disilanols were reacted to produce a second generation dendritic molecule.

The current industry standard space solar cell adhesive, Dow Corning 93-500 (a PDMS) is prone to UV-induced darkening (with decrease in transmission) and has poor proton resistance relative to materials with phenyl content, and poor atomic oxygen resistance relative to materials with POSS content.

ENTECH POSS modified DC-93-500 has better atomic oxygen resistance than DC-93-500 but no improvement in proton resistance (see B. Wells, H. Brandhorst, T. Isaacs-Smith, "Radiation tolerant POSS solar cell cover glass replacement material", 5th International Energy Conversion Engineering Conference and Exhibit (IECEC), 25-27 Jun. 2007, St. Louis, Mo., AIAA 2007-4733).

Hybrid Plastics Firequench PM1257 POSS phenyl-containing resin has good proton resistance but poor UV resistance, poor adhesion and a tendency to crack at low temperatures (see H. Brandhorst, T. Isaacs-Smith, B. Wells, "POSS® coatings as replacements for solar cell cover glasses", 4th International Energy Conversion Engineering Conference and Exhibit (IECEC), 26-29 Jun. 2006, San Diego, Calif., AIAA 2006-4138).

POSS-modified methacrylate, POSS-modified polyimide (e.g., Hybrid Plastics POSSImiClear® and POSSImiDur®) and POSS-modified epoxy resins have also been evaluated for resistance to space radiation. Although they showed better resistance than the corresponding materials without POSS, none of them demonstrated better resistance to proton radiation than did the PM1287 resin. In addition, both the POSS-modified methacrylate and the POSS-modified polyimide resins have adsorption cut-off wavelengths above 400 nm, which limits their use in multi-junction solar cell applications (see B. Wells, H. Brandhorst, T. Isaacs-Smith, "Radiation tolerant POSS solar cell cover glass replacement material", 5th International Energy Conversion Engineering Conference and Exhibit (IECEC), 25-27 Jun. 2007, St. Louis, Mo., AIAA 2007-4733).

Clearly, as all these prior linear polymers, HB polymers and POSS polymers have property drawbacks, it would be advantageous to have a more useful HB-POSS polymer for the desired properties as provided by this invention.

BRIEF SUMMARY OF THE INVENTION

This invention relates to novel HBP-POSS polymers prepared from an $A_x$ monomer (having x functional A groups, x≥2) and a $B_y$ monomer (having y functional B groups, y>2) where one or both of $A_x$ and $B_y$ is a POSS monomer, that are used as coatings, films, adhesives, sealants and elastomers in space, solar energy, electronics or electrical applications. The $A_x$-$B_y$ polymer has 2 or more repeat units. More specifically, this invention provides a HBP Free-POSS polymer compound of the formula $$[A_x]_p[B_y]_q \qquad \text{Formula I}$$

wherein:

$A_x$ is a POSS entity including closed-caged T8, T10, or T12 or an open-cage T8, T10, or T12 or another non-POSS monomer, having x number of A-type functional groups selected from hydridosilyl (SiH), vinyl, hydroxyl or alkoxysil, with all functionality being the same for a given number;

x is an integer of 2 or more;

p is an integer of 2 or more; and $B_y$ is a POSS entity including closed-caged T8, T10, or T12 or an open-cage T8, T10, or T12, or another non-POSS monomer, having y number of B-type functional groups that are chosen to react with the A-type functional groups and are selected from vinyl, hydridosilyl (SiH), alkoxsilyl or hydroxyl, with all functionality being the same for a given monomer;

y is an integer of 3 or more;

q is an integer of 2 or more; and when present, the non-POSS monomer is $H(SiR_2O)_mSiR_2H$, vinyl-$(SiR_2O)_mSiR_2$-vinyl, $Si(OSiR_2H)_4$, $HSiR_2CH_2CH_2SiR_2H$, $H(Si(OR)_2O)_mSi(OR)_2H$, or vinyl$(Si(OR)_2O)_mSi(OR)_2$vinyl, where R is $C_1$-$C_5$ alkyl or $C_6$-$C_{14}$ aryl, and m is 1 or more;

provided that if A and B are both POSS entites, then x does not equal y; and provided that if A and B are both POSS entities, they are not identical entities; and provided that one of A or B must be a POSS entity; and wherein the polymer contains curable groups for further reaction, which curable groups are either initially present or have been added by a capping agent; and the polymer of Formula I is a non-cross linked, non-network hyperbranched polymer.

BRIEF DESCRIPTION OF THE DRAWINGS

FIG. 5 shows the transmittance data for a 25% HBP-POSS(SiPhMe)-SiMe$_2$OH/75% Gelest PDS-1615 (diphenylsiloxane-PDMS copolymer, 14% SiPh$_2$) formulation before (FIG. 5A) and after (FIG. 5B) 650 equivalent sun hours (ESH) of UV exposure FIG. 6 shows the Initial transmission performance (FIG. 6A), transmission after proton exposure (FIG. 6B) and transmission after electron exposure (FIG. 6C) for the 25% HBP-(8Vi)POSS-SiMe$_2$C$_2$H$_4$Si(OEt)$_3$/75% PDS-1615 (14% diphenyl, Mw 1000) adhesive formulation versus the PDMS control adhesive

DETAILED DESCRIPTION OF THE INVENTION

Glossary

The following terms as used in this application are to be defined as stated below and for these terms, the singular includes the plural.

Aryl means benzyl, phenyl or any other aromatic group cm means centimeters

DHB means dihydroxybenzophenone

DSC means dynamic scanning calorimetry

Et means ethyl g(s) means gram(s)

HB means hyperbranched

HBP means hyperbranched polymer

HBP Free means hyperbranched polymer that is not cross linked and not a network hr(s) means hour(s)

IPA means isopropyl alcohol

IR means infrared spectroscopy

L means liter(s)

MALDI-TOF MS means matrix-assisted laser desorption ionization time of flight mass spectroscopy Me means methyl min(s) means minutes mL means milliliters nm means nanometer(s)

NMR means nuclear magnetic resonance

Non-POSS monomer means $H(SiR_2O)nSiR_2H$, vinyl-$(SiR_2O)_nSiR_2$-vinyl, $Si(OSiR_2H)_4$, $HSiR_2CH_2CH_2SiR_2H$ (R=$C_1$-$C_5$ alkyl or $C_6$-$C_{14}$ aryl) and n is 2 or more or any other multifunctional compound, preferably organosilicon PDMS means polydimethylsiloxane Ph means phenyl POSS means polyhedral oligosilsesquioxanes RT means room temperature or ambient temperature, about 20 to about 25° C.

SEC means size exclusion chromatography

THF means tetrahydrofuran

General Discussion

The use of HB POSS phenyl-containing polymers of Formula I gives an unexpected combination of proton resistance (from POSS and phenyls), electron resistance (particularly at low wavelengths of importance in multijunction photovoltaics), atomic oxygen resistance (from POSS), transparency (from nano-POSS domains), ability to crosslink (to form cured coatings, adhesives, sealants or films), low viscosity (from HB architecture), low glass transition temperature (from FIB architecture), good adhesion and no cracking over wide temperature range (from hyperbranched and POSS architecture), and low out-gassing (owing to hyperbranched rather than linear architecture, and no tendency to generate low mass volatiles).

In contrast, with increasing pendant phenyl content (i.e., attempting to increase proton resistance), linear siloxanes become more viscous, their glass transition temperature increases, their adhesion performance deteriorates and they have a greater tendency to crack at temperature extremes. Linear siloxanes with pendant POSS groups also have higher viscosity, increased glass transition temperature, poorer adhesion and greater tendency to crack relative to linear PDMS. Linear siloxanes are not inherently able to be cross-linked and need to be formulated with an additional material (e.g., multifunctional crosslinking compound, peroxide etc.) in order to cure to form coatings, adhesives, sealants or films.

Unexpectedly from this knowledge, the present HB-POSS polymers provide a superior product for all the intended uses.

Present Invention

The present invention takes a different approach by using POSS as one or both of the monomers in an $A_x$-$B_y$ HBP Free where the polymer is soluble in a wide range of solvents [for example isopropyl alcohol (IPA), toluene, hexane, dichloromethane, heptanes, tetrahydrofuran (THF), methanol (MeOH), ethanol (EtOH), acetone, water], preferably those used for casting films, coatings and adhesives.

The present invention provides a HBP Free-POSS polymer compound of the formula:

$$[A_x]_p[B_y]_q \qquad \text{Formula I}$$

wherein:

$A_x$ is a POSS entity including closed-caged T8, T10, or T12 or an open-cage T8, T10, or T12 or another non-POSS monomer, having x number of A-type functional groups selected from hydridosilyl (SiH), vinyl, hydroxyl or alkoxysiyl, with all functionality being the same for a given monomer;

x is an integer of 2 or more;
p is an integer of 2 or more; and
$B_y$ is a POSS entity including closed-caged T8, T10, or T12 or an open-cage T8, T10, or T12, or another non-PUSS monomer, having y number of B-type functional groups that are chosen to react with the A-type functional groups and are selected from vinyl, hydridosilyl (SiH), alkoxysilyl or hydroxyl, with all functionality being the same for a given monomer;
y is an integer of 3 or more;
q is an integer of 2 or more; and
when present, the non-POSS monomer is $H(SiR_2O)_mSiR_2H$, vinyl-$(SiR_2O)_mSiR_2$-vinyl, $Si(OSiR_2H)_4$, $HSiR_2CH_2CH_2SiR_2H$, $H(Si(OR)_2O)_mSi(OR)_2H$, or vinyl$(Si(OR)_2O)_mSi(OR)_2$vinyl, where R is $C_1$-$C_5$ alkyl or $C_6$-$C_{14}$ aryl, and m is 1 or more;
provided that if A and B are both POSS entities, then x does not equal y; and provided that if A and B are both FOSS entities, they are not identical entities; and provided that one of A or B must be a POSS entity;
wherein the polymer contains curable groups for further reaction, which curable groups are either initially present or have been added by a capping agent; and
the polymer of Formula I is a non-cross linked, non-network hyperbranched polymer.

Non-POSS monomers for use in Formula I include known monomers such as $H(SiR_2O)_nSiR_2H$, vinyl-$(SiR_2O)_nSiR_2$-vinyl, $Si(OSiR_2H)_4$, $HSiR_2CH_2CH_2SiR_2H$, $H(Si(OR)_2O)_nSi(OR)_2H$, and vinyl$(Si(OR)_2O)_nSi(OR)_2$vinyl, wherein R is $C_1$-$C_5$ alkyl (e.g., Me) or $C_6$-$C_{14}$ aryl (e.g., Ph), and n is 1 or more, or any other multifunctional compound, preferably organosilicon.

The POSS may have some groups that are not involved in the polymerization (not A or B groups). Thus the POSS must be in the backbone of the HB polymer as a repeat unit group (not a terminal, pendant or core group only). Such non-A and non-B substituents are alkyl or aryl groups, curable groups, or groups that perform a function (e.g., sensing, fluorescent, phosphorescent, optical, biocidal, drug or fragrance release and the like). Preferred polymers are those based on a non-POSS A2 monomer and a B8 POSS monomer. Certain specific HBP-POSS polymers have been found very useful such as HB polycarbosiloxane containing POSS depicted by Formula IA below:

HBP-(8Vi)POSS-SiMe$_2$C$_2$H$_4$Si(OR)$_3$ wherein: each n is independently 2 to 1000 and R is $C_1$-$C_{100}$ alkyl; and HB polysiloxane containing POSS depicted by Formula IB below.

Abbreviated as: HBP-POSS(SiR$^1$R$^2$)-SiMe$_2$OH wherein: n is 2 to 1000, and R is $C_1$-$C_{100}$ alkyl.

In these above formulae, the alkyl can be straight-or branched-chained alkyl groups.

Utility

The compounds of Formula I are used as coatings, films, adhesives, sealants and components in elastomer formulations when these polymers are functionalized with curable end-groups such as SiOR. These compounds are also used as crosslinking agents in formulations with linear polymers. Particularly desired for these properties are these polymers used in space, solar energy, electronics or electrical applications as discussed below.

Use of the Polymers of Formula I: Cover Glass Adhesive for Space Solar Cells, Protective Coatings for Next Generation of Space Solar Cells without Cover Glasses, Protective Coatings for Flexible Space Solar Cells.

These uses for space solar cells requires a wide range of properties, such as high transparency, optical clarity and transmission across the ultra-wide wavelength range (300 to 1800 nm) used by multi-junction solar cells, resistance to proton, electron, UV radiation and atomic oxygen attack, good adhesion, resistance to cracking and delamination, ability to function across a wide temperature range (−15 to 120° C. in earth orbit, up to 250° C. for interplanetary application), ease of application from solvent (instead of chemical vapor deposition (CVD), vacuum or clean room processes), good shelf life and humidity resistance prior to application, tailorable pre-cure viscosity (to match techniques and equipment favored by end-user), tailorable cure time (to match process favored by end-user), minimal out-gassing in space environment, ability to form conformable layer capable of being folded or rolled up without damage, compatibility with other space solar cell components such as anti-reflective (AR) aluminum oxide-tin oxide coatings and conductive electrostatic discharge (CED) indium-tin-oxide (ITO) coatings, and tailorable refractive index (1.40 to 1.50) to achieve match with other layers.

Use of the Polymers of Formula I: Protective Coatings for Terrestrial Solar Concentrators and Protective Coatings for Terrestrial Organic Photovoltaics.

This use requires many properties, such as high transparency, optical clarity and transmission across wide wavelength range, excellent UV resistance, low water and oxygen permeability, good adhesion, resistance to cracking and delamination, ability to function across a wide temperature range (varying weather conditions), ease of application from solvent (instead of chemical vapor deposition (CVD), vacuum or clean room processes), good shelf life and humidity resistance prior to application, tailorable pre-cure viscosity (to match techniques and equipment favored by end-user), tailorable cure time (to match process favored by end-user), conformable layer capable of being folded or rolled up without damage, compatibility with other components such as anti-reflective (AR) aluminum oxide-tin oxide coatings, and tailorable refractive index (1.40 to 1.50) to achieve match with other components.

The HB-POSS compounds as defined in Formula I are superior to prior HB polymers in these applications because they have better resistance to protons and atomic oxygen. Silica-filled PDMS is opaque, but POSS is a nanoscale object that enables a POSS-containing polymer to be transparent. This is an important feature for several space and electronic applications.

The invention will be further clarified by a consideration of the following examples, which are intended to be purely exemplary of the present invention.

Materials

All reagents were used as received from commercial sources unless otherwise stated. POSS reagents were obtained from Hybrid Plastics, Inc. (Hattiesburg, Miss.). HB polymer was prepared as described in the examples below.

Methods

Preparation of octasilanol-POSS monomer (required for HB polysiloxane synthesis) is reported in 'Photocurable Silicon-based Materials for Imprint Lithography' J. Hao, M. W. Lin, F. Palmieri, Y. Nishimura, H-L. Chao, M. D. Stewart, A. Collins, K. Jen, C. G. Wilson, *Proc. SPIE*, 6517, 651729/1-651729/9 (2007).

Example 1

Synthesis of HBP Polycarbosiloxane from Octavinyl POSS®

Step 1. HBP(8Vi)POSS-(SiMe$_2$H)$_m$

Octavinyl-POSS (4 g, 6.32 mmol) was weighed into a round-bottom flask that was equipped with a cooling condenser. To the flask was added THF (40 mL) and Karstedt's catalyst (0.04 g, ~2% platinum-divinyltetramethyl-disiloxane complex in xylene). The solution was stirred for 10 min under nitrogen. 1,1,3,3-Tetramethyldisiloxane (23.2 g, 187 mmol) was then added. The mixture was stirred at RT for 1 hr and then heated in an oil bath at 50° C. for 16 hrs. The clear viscous oil was washed with anhydrous acetonitrile (5×25 mL) and dried using a rotary evaporator. It was further dried under vacuum overnight to yield 8 g of product. Its spectra are:

IR (thin film): ν (cm$^{-1}$) 2959, 2922, 2897, 2872 (CH$_3$ and CH$_2$, sym and asym), 2119 (SiH), 1405, 1254 (SiCH$_3$), 1117 (SiOSi), 1057 (SiOSi), 909, 839 (SiCH$_3$ rock), 806 (SiOSi sym);

$^1$H NMR (CDCl$_3$): δ (ppm) 0.0 (s; SiCH$_3$), 0.2 (s; CH$_3$SiH), 0.6 (s, SiCH$_2$), 4.7 (s; SiH);

$^{29}$Si NMR (30 wt. % in THF-d$_8$) −58.7 (O$_3$SiCH$_2$), −0.6 (OSiMe$_2$H), 17.6 (OSiMe$_2$CH$_2$);

SEC (Toluene): M$_w$=2666, M$_n$=2309, polydispersity=1.15;

DSC (10° C. min$^{-1}$, nitrogen) −67° C.; and

Refractive index 1.4457 at 23° C.

Step. 2. HBP(8Vi)POSS-SiMe$_2$C$_2$H$_4$Si(OEt)$_3$

A 50 mL round-bottom flask equipped with a vertical cooling condenser was charged with POSS-1-HBP-(SiMe$_2$H)$_m$ (3.0 g) and vinyltriethoxylsilane (4.1 g). It was flushed with N$_2$ and stirred for 5 mins. Karstedt's catalyst (0.0121 g, ~2% platinum-divinyltetramethyl-disiloxane complex in xylene) was added to the mixture. It was stirred at RT for 1 hr and then heated in an oil bath at 50° C. for 16 hrs. The clear viscous oil was washed with anhydrous acetonitrile (5×15 mL) and dried in a rotary evaporator. The product designated as POSS-HBP-(SiMe$_2$C$_2$H$_2$Si(OEt)$_3$)$_m$ was further dried under vacuum for 5 hrs. The yield was 4.5 g. Its spectra are:

IR (thin film): ν (cm$^{-1}$) 2973, 2924, 2887 (CH$_3$ and CH$_2$, sym and asym), 1442, 1407, 1389, 1253 (SiCH$_3$), 1105 (SiOSi), 1080 (SiOSi), 956, 840 (SiCH$_3$ rock), 783 (SiOSi sym), no SiH at 2119; and Refractive index 1.4438 at 23° C.

Figure 1:
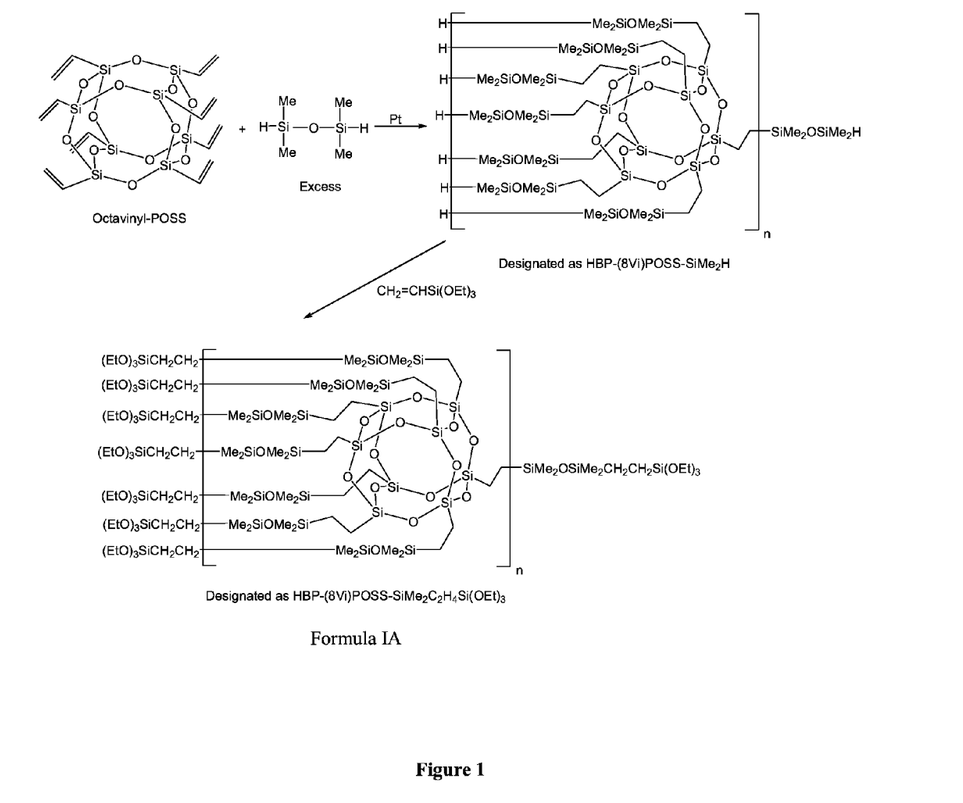
FIG. 1 illustrates the preparation of hyperbranched polycarbosiloxane.

See FIG. 1 for a depiction of this reaction.

Example 2

Synthesis of Octa(SiOH)-POSS Hyperbranched Polysiloxane Monomer

A solution of Octasilane POSS® (0.36 g, 0.35 mmol) in 1,4-dioxane (25 mL) was added dropwise to a suspension of 10% palladium on charcoal (0.1 g) in a mixture of dioxanes (5 mL) and a buffer solution (0.7 g, 4.7 mmol/L $NaH_2PO_4.H_2O$ and 4 mmol/L NaOH). After the addition, the solution was stirred at RT for 16 hrs. The solution was filtered and the solvent was removed using a rotary evaporator. The resulting white solid was dissolved in ethyl acetate and filtered again. The product was dried in a rotary evaporator and then further dried for 12 hrs under vacuum to yield 0.3 g of a white powder. Melting point>300° C. Its spectra are:

IR (KBr disc): ν ($cm^{-1}$) 3385 (SiOH), 2966 ($CH_3$), 1264 ($SiCH_2$), 1092 (SiOSi asym), 888, 849 ($SiCH_3$ rock), 799 (SiOSi sym);

$^1H$ NMR ($CD_3COCD_3$): δ (ppm) 0.0 (s; $SiCH_3$);

$^{29}Si$ NMR (30 wt. % in THF-$d_8$) −109.6 ($SiO_4$), −11.1 ($OSiMe_2OH$);

MALDI-TOF MS (DHB, THF): 1169 (Calc. 1169, M+Na); and

Elemental analysis: 4.97% H (Calc. 4.93%), 14.35% C (Calc. 16.77%).

Figure 2:
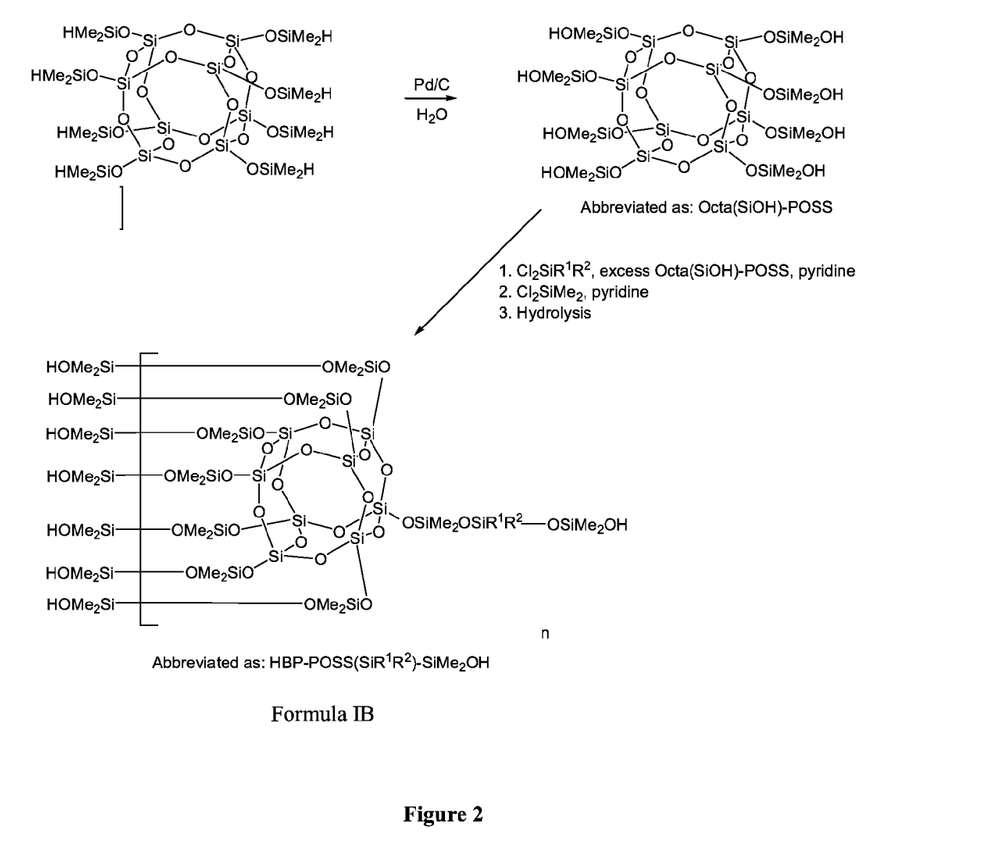
FIG. 2 illustrates the preparation of hyperbranched polysiloxane

See FIG. 2 a depiction of this reaction.

Example 3

Synthesis of HBP-POSS-SiMe$_2$OH Hyperbranched Polysiloxane

Step 1. HBP-POSS-SiMe$_2$Cl

A triple-neck round-bottom flask and a condenser were dried in an oven at 120° C. for 12 hrs, and were then were cooled to RT with a nitrogen stream. Octa(SiOH)-POSS (0.5 g, 0.44 mmol) was weighed into the flask equipped with the cooling condenser, and THF (10 mL) was added. The solution was cooled to −78° C. in a dry ice/acetone bath and dimethyldichlorosilane (1.58 mL, 13 mmol, freshly distilled prior to use) was added through a syringe. This was followed by the addition of freshly distilled pyridine (0.30 mL, 3.71 mmol). The reaction was allowed to warm up to RT and stirred overnight for 16 hrs.

Step 2. Hydrolysis of HBP-POSS-SiMe$_2$Cl in the Presence of Pyridine

Solvent was evaporated off the reaction solution from Step 1 using a rotary evaporator and hexane (20 mL) was added. Pyridine (2.2 mL) was added dropwise using a syringe and then distilled water (1.2 mL) was added. The solution was stirred at RT for 1.5 hrs and washed three times with water. The hexane solvent was evaporated to yield 0.42 g of a clear viscous oil. Its spectra are:

IR (KBr disc): ν ($cm^{-1}$) 3317 (SiOH), 2906 ($CH_3$), 1448, 1411, 1262 ($SiCH_2$), 1112, 1067 (SiOSi asym), 849 ($SiCH_3$ rock), 803 (SiOSi sym);

$^1H$ NMR ($CD_3COCD_3$): δ (ppm) 0.0 (s; $SiCH_3$);

$^{29}Si$ NMR (30 wt. % in THF-$d_8$)-109.3 ($SiO_4$), −20.9 ($O_2SiMe_2$), −18.7 ($O_2SiMe_2$), −12.9 ($OSiMe_2OH$);

SEC (THF): $M_w$=4346, $M_n$=2319, polydispersity=1.87; and

Refractive index 1.4215 at 23° C.

Example 4

Synthesis of HBP-POSS(SiPhMe)-SiMe$_2$OH Hyperbranched Polysiloxane

A triple-neck round-bottom flask and a condenser were dried in an oven at 120° C. for 12 hrs. They were cooled to RT with a nitrogen stream. Octa(SiOH)-POSS (1.0 g, 0.87 mmol) was weighed into the flask equipped with the cooling condenser, and THF (20 mL) was added. The solution was cooled to −78° C. in a dry ice/acetone bath and methylphenyldichlorosilane (0.112 mL, 0.7 mmol) was added through a syringe. This was followed by the addition of freshly distilled pyridine (0.114 mL, 1.41 mmol). The reaction was allowed to warm up to RT and stirred for 16 hrs. The reaction was cooled down again to −78° C. in a dry ice/acetone bath and dimethyldichlorosilane (3 mL, 24.72 mmol) was added through a syringe. This was followed by the addition of distilled pyridine (4 mL, 49.46 mmol). The reaction was then warmed up to RT and stirred overnight for 16 hrs. The volatiles were removed using a rotary evaporator and hexane (20 mL) was added. Pyridine (4.5 mL) was added dropwise via a syringe, followed by the addition of distilled water (5 mL). The solution was stirred at RT for 2 hrs and transferred to a separation funnel. The water layer was washed with hexane three times. All hexane washings were combined and evaporated to give a viscous oil. The mixture was re-dissolved in hexane (20 mL) and washed three times with water. Sodium sulfate was used to dry the moisture in hexanes solution and was filtered out. The hexane phase yielded 0.82 g of sticky pale yellow oil. Its spectra are:

IR (KBr disc): ν ($cm^{-1}$) 3301 (SiOH), 3072 (PhH), 2964, 2906 ($CH_3$), 1593, 1447, 1430, 1411, 1262 ($SiCH_2$), 1076 (SiOSi asym), 891, 849 ($SiCH_3$ rock), 804 (SiOSi sym);

$^1H$ NMR ($CD_3COCD_3$): δ (ppm) 0.0 (s; $SiCH_3$) 7.4 (m; ArH), 7.6 (m; ArH);

$^{29}Si$ NMR (30 wt. % in THF-$d_8$) −109.3 ($SiO_4$), −33.7 ($O_2SiMePh$), −20.9 ($O_2SiMe_2$), −18.5 ($O_2SiMe_2$), −12.8 ($OSiMe_2OH$);

SEC (THF): $M_w$=8513, $M_n$=3240, polydispersity=2.63; and

Refractive index 1.4330 at 23° C.

Example 5

Synthesis of HBP-POSS(SiPh$_2$)-SiMe$_2$OH Hyperbranched Polysiloxane

A triple-neck round-bottom flask and a condenser were dried in an oven at 120° C. for 12 hrs. They were cooled to RT with a nitrogen stream. Octa(SiOH)-POSS (1.0 g, 0.87 mmol) was weighed into the flask equipped with the cooling condenser, and THF (20 mL) was added. The solution was cooled to −78° C. in a dry ice/acetone bath and diphenyldichlorosilane (0.144 mL, 0.7 mmol) was added through a syringe. This was followed by the addition of freshly distilled pyridine (0.114 mL, 1.41 mmol). The reaction was allowed to warm up to RT and stirred for 16 hrs. The reaction was cooled down again to −78° C. in a dry ice/acetone bath and dimethyldichlorosilane (3 mL, 24.72 mmol) was added through a syringe. This was followed by the addition of distilled pyridine (4 mL, 49.46 mmol). The reaction was then warmed up to RT and stirred overnight for 16 hrs. The volatiles were removed using a rotary evaporator and hexane (20 mL) was added. Pyridine (4.5 mL) was added dropwise via a syringe, followed by the addition of distilled water (5 mL). The solution was stirred at RT for 2 hrs and transferred to a separation funnel. The water layer was washed with hexane three times. All hexane washings were combined and evaporated to give a viscous oil. The mixture was re-dissolved in hexane (20 mL) and washed three times with water. Sodium sulfate was used to dry the moisture in hexanes solution and was filtered out. The hexane phase yielded 1.04 g of sticky pale yellow oil. Its spectra are:

IR (KBr disc): ν (cm$^{-1}$) 3312 (SiOH), 3072 (PhH), 2963, 2905 (CH$_3$), 1593, 1487, 1430, 1411, 1262 (SiCH$_2$), 1068 (SiOSi asym), 848 (SiCH$_3$ rock), 805 (SiOSi sym);

$^1$H NMR (THF-d$_8$): δ (ppm) 0.0 (s; SiCH$_3$) 7.37 (m; ArH), 7.63 (m; ArH);

$^{29}$Si NMR (30 wt. % in THF-d$_8$) −107.6 (SiO$_4$), −45.4 (O$_2$SiPh$_2$), −19.2 (O$_2$SiMe$_2$), −16.9 (O$_2$SiMe$_2$), −11.2 (OSiMe$_2$OH);

SEC (THF): M$_w$=3128, M$_n$=2031, polydispersity=1.54; and

Refractive index 1.4616 at 23° C.

Example 6

Preparation of Adhesives and Coatings

Part A: Preparation of Adhesives and Conformable Coatings at Various Tin Catalyst Levels 0.2 g POSS-HBP(8Vi)[Si(OEt)$_3$]$_m$ and 0.8 g poly(dimethylsiloxane)-(diphenylsiloxane) (Gelest PDS-0332) were mixed using a Vortex Mixer. Various amounts (1%, 2.5% or 5%) of Sn(II) catalyst [bis(2-ethylhexanoate) tin] were added and mixed. The formulations were cast by wire-wound lab rods of wire size #12 (Paul N. Dardner Company) onto glass slides, and then covered immediately and pressed tightly together with a second glass slide. The three formulations were cured in an oven at 120° C. for 1 day, or at RT overnight. All the formulations firmly adhered to glass slides.

Part B: Preparation of Adhesives and Coatings Using an Acid Catalyst

A 5 mL vial was charged with HBP(8Vi)POSS(SiOEt)$_3$ and silanol-terminated polydimethylsiloxane linear polymer DMS-S15 (Gelest) at the desired ratio, to total approximately 0.5 g. Heptane (0.1 mL) was used to dissolve the components with gentle agitation. Propionic acid (5 wt %) was added to the solution and agitated until completely dissolved. The solution was then carefully transferred to a glass slide, allowed to stand for 20 mins and then cured at 150° C. for 16 hrs. A transparent and robust material was obtained.

Example 7A

Preparation of Transparent and Crack-resistant Adhesives, Coatings and Films HBP and linear components were mixed. Sn(II) catalyst [2% bis(2-ethylhexanonate)tin, based on mass of solid polymer in 10% w/w hexane solution] was added. The mixture solution was cast onto a glass slide and cured at 120° C. for 24 hrs. In cases where polysilphenylene siloxane linear polymer was used, a few drops of THF were added to hexane to achieve solubility. The following Table 1 shows these results; namely, that example formulations were transparent, did not crack or delaminate during temperature cycling from −196° C. (liquid nitrogen) to 250° C. and had a scratch hardness of 3B. The scratch hardness of cured materials was determined using a Paul-Gardner Scratch Tester (Model #3363). The hardness measurements were conducted in accordance with the protocol established by the American Society for Testing and Materials, ASTM D 3363-74.

TABLE 1

Transparent formulations with good thermal cycling performance

| Hyperbranched POSS Component | Linear Component | HBP/Linear Mass Ratio |
|---|---|---|
| HBP(8Vi)POSS-Si(OEt)$_3$ | Gelest DMS-S31 PDMS SiOH-terminated, Mw 26,000 | 10/90, 25/75 |
| HBP(8Vi)POSS-Si(OEt)$_3$ | Gelest DMS-S15 PDMS SiOH-terminated, Mw 2000 | 25/75 |
| HBP(8Vi)POSS-Si(OEt)$_3$ | Gelest DMS-S12 PDMS SiOH-Terminated, Mw 400 | 10/90 |
| HBP(8Vi)POSS-Si(OEt)$_3$ | Gelest PDS-1615, 14% Ph$_2$ SiOH-terminated, Mw 1000 | 25/75 |
| HBP-POSS(SiMePh)—SiMe$_2$OH | Gelest DMS-S31 PDMS SiOH-terminated, Mw 26,000 | 25/75, 50/50 |
| HBP-POSS(SiMePh)—SiMe$_2$OH | Gelest DMS-S15 PDMS SiOH-terminated, Mw 2000 | 25/75 |
| HBP-POSS(SiMePh)—SiMe$_2$OH | Gelest DMS-S12 PDMS SiOH-Terminated, Mw 400 | 10/90, 25/75 |
| HBP-POSS(SiMePh)—SiMe$_2$OH | Gelest PDS-1615, 14% Ph$_2$ SiOH-terminated, Mw 1000 | 25/75 |
| HBP-POSS(SiPh$_2$)—SiMe$_2$OH | Gelest PDS-1615, 14% Ph$_2$ SiOH-terminated, Mw 1000 | 25/75, 50/50 |
| HBP-POSS(SiPh$_2$)—SiMe$_2$OH | Polysilphenylenesiloxane SiOH-terminated, Mw 3000 | 75/25 |

Example 7B

Superior Thermal Cycling Performance of a POSS-Hyperbranched Polymer vs. a POSS-Free Control Hyperbranched Polymer 400 Test cycles were performed in a fast cycle chamber (120° C. to −180° C., 2.9 mins per cycle) with samples mounted on a Kapton sheet and held in place with Kapton tape. A 25% HBP-Si(Me)-Si(OEt)$_3$/75% DMS-S15 polydimethylsiloxane (POSS-free control) formulation delaminated while a 25% HBP-POSS(8Vi)-Si(OEt)$_3$/75% DMS-S15 polydimethylsiloxane formulation remained unchanged.

Example 8

Transmission Tests Above 400 nm

Measurements were made on Qioptiq CMG 100 AR cover glass substrates where transmission cut off at 400 nm, and are summarized in Table 2 below.

TABLE 2

Transmission test results for HBP-(8Vi)POSS-SiMe$_2$C$_2$H$_4$Si(OEt)$_3$ formulations

| Sample | Thickness (μm) | Transmittance |
|---|---|---|
| Glass Control | NA | 92% from 500-2500 nm |
| PDMS Control | ~99 | 1600-1700 nm down to 88% 2300-2500 nm down to 70% |
| 25% HBP-(8Vi)POSS-Si(OEt)$_3$ 75% Gelest PDS-1615 (14% diphenyl, Mw 1000) | ~40 | 1600-1700 nm at 92% 2300-2500 nm down to 84% |

HBP-POSS formulations show a general transmittance of 92% (comparable to the glass control) across the 500 to 2500 nm range. HBP-POSS formulations had superior transmittance to the PDMS control sample (DC-93-500). The PDMS control had two absorbencies in the 1600-1700 nm region while the HBP-POSS formulations did not. The PDMS control sample and the HBP-POSS formulations had two absorbencies in the 2300-2500 nm range. The transmittance of the PDMS control dropped to 70% in this region, while the transmittances of the HBP-POSS samples dropped to 84 to 90%.

Example 9

Transmission Tests Below 400 nm

Figure 3:
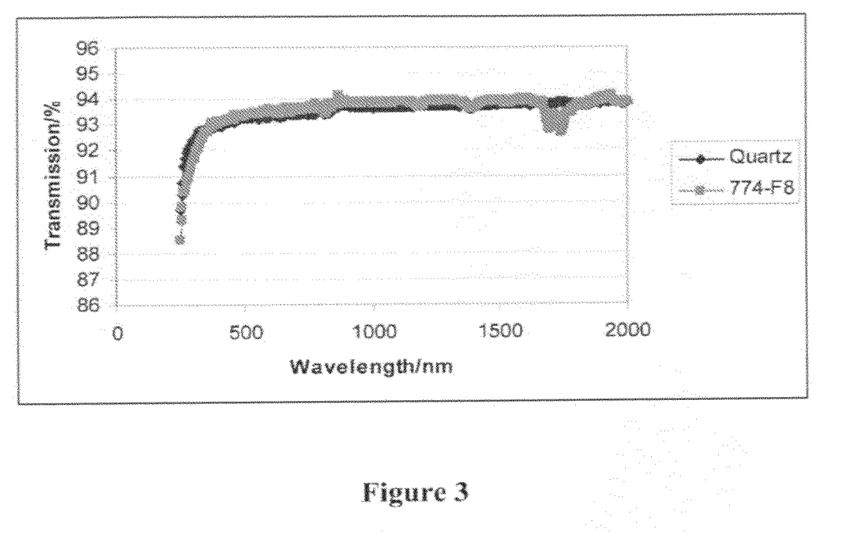
FIG. 3 shows the transmission data for 25% HBP(8Vi)POSS-Si(OEt)$_3$/75% DMS S31 (PDMS, Mw 26,000) on quartz coupon
Figure 4:
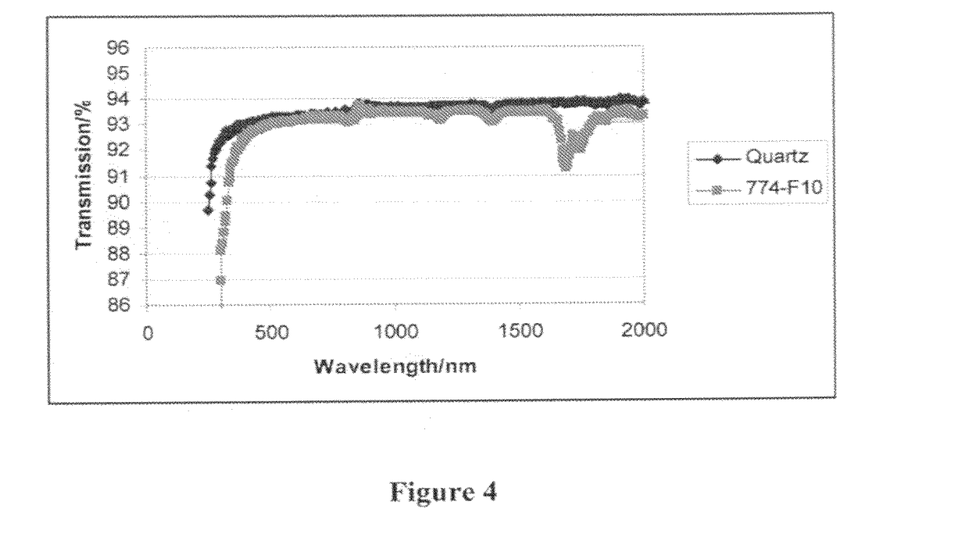
FIG. 4 shows the transmission data for 25% HBP(8Vi)POSS-Si(OEt)$_3$/75% PDS-1615 (14% SiPh$_2$, Mw 1000) on quartz coupon

Measurements were made on quartz coupons where transmission cut-off at 300 nm. For the PDMS control and for adhesive formulations of the present invention with no phenyl content, the transmission cut-off was comparable with that of quartz, but as phenyl content increased, cut-off occurred at higher wavelengths (see FIGS. 3 and 4).

Example 10

UV Radiation Testing

Figure 5A:
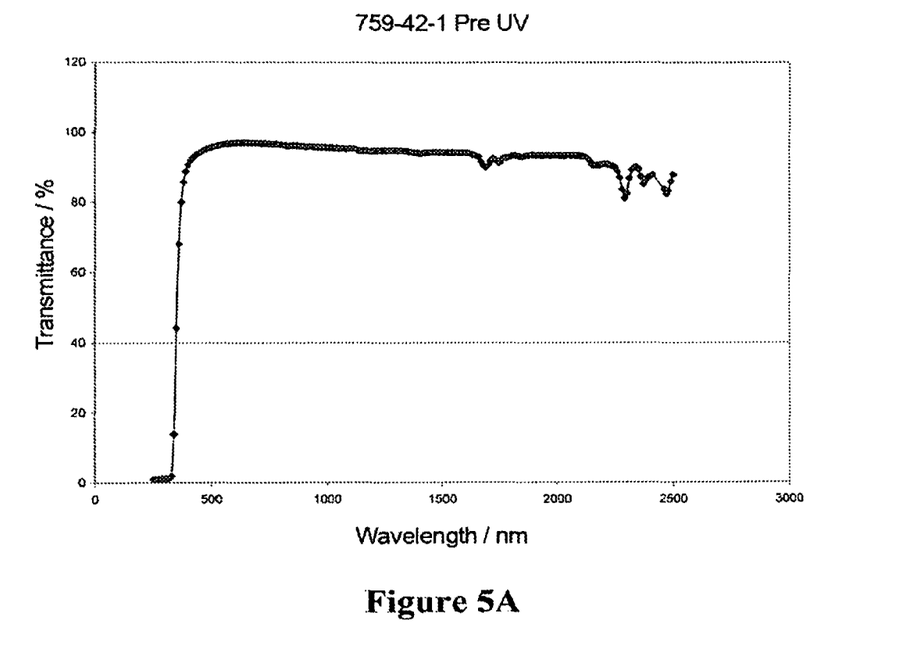
Figure 5B:
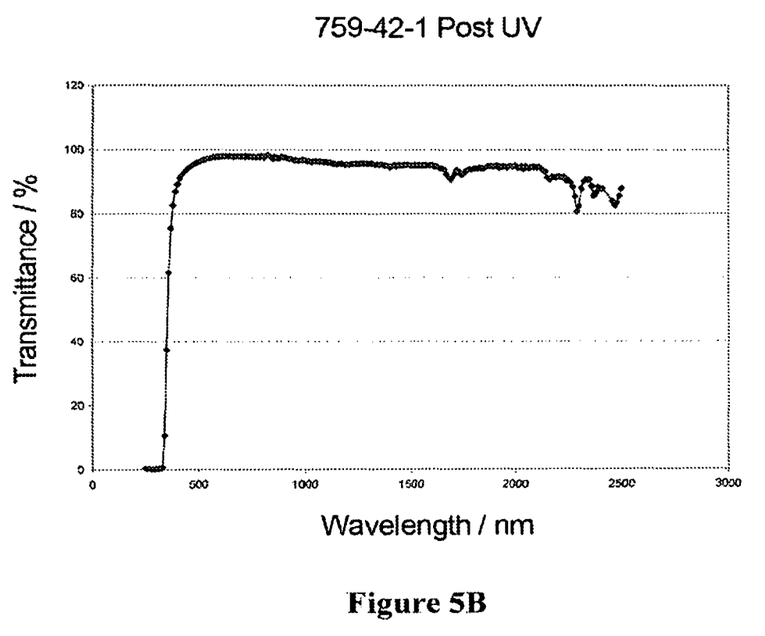

A 25% HBP-POSS(SiPhMe)-SiMe$_2$OH/75% Gelest PDS-1615 (diphenylsiloxane-PDMS copolymer, 14% SiPh$_2$) formulation was exposed to 650 equivalent sun hrs (ESH) of UV radiation under vacuum. Adhesive layers (50 μm) were sandwiched between two 115 μm cover glasses. Transmittance from 400 nm to 2000 nm was measured before and after exposure. A concentrated Xenon lamp was used that emitted wavelengths in the range 200-700 nm, with a maximum at ~500 nm. The formulation shows no discernible change in transmittance before and after UV exposure across the entire wavelength range (see FIG. 5). UV had little effect on the PDMS control or any of the Example 7 formulations, even those of highest phenyl content.

Example 11A

Proton and Electron Radiation Testing

Figure 6A:
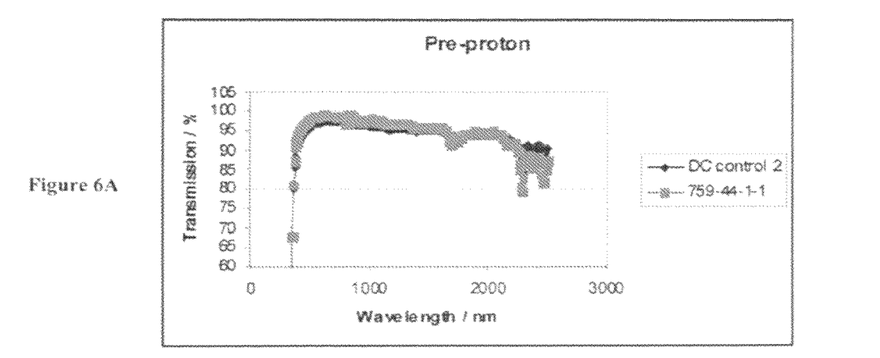
Figure 6B:
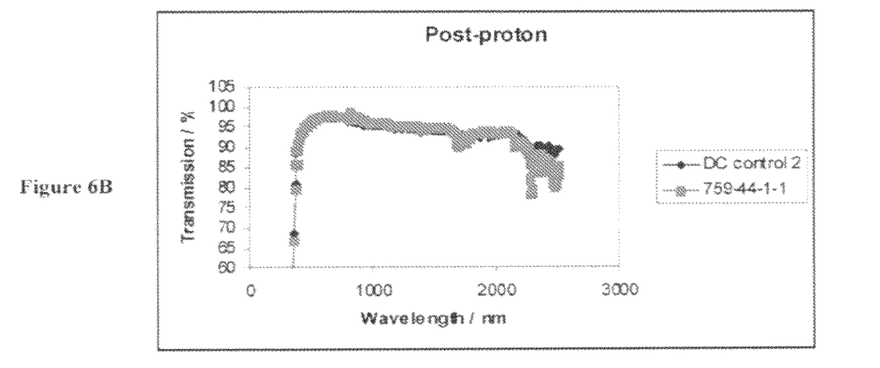
Figure 6C:
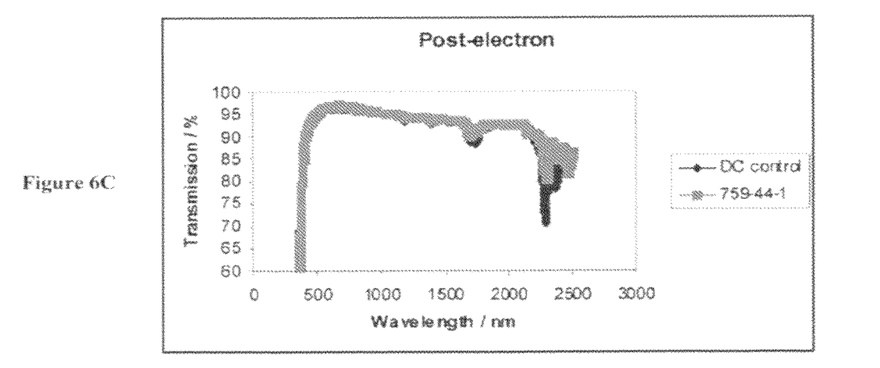

Samples were exposed to 2 MeV protons at a fluence of 1E13 p/cm$^2$ which is understood to be equivalent to approximately 15 years service in geosynchronous earth orbit (GEO) or medium earth orbit (MEM Samples were exposed to 1 MeV electrons at a fluence of 3E15 e/cm$^2$. Transmittance from 400 nm to 2000 nm was measured before and after exposure. Adhesive layers (50 μm) were sandwiched between two 115 μm cover glasses. PDMS control samples were damaged by proton and electron radiation, but the following are examples of formulations that were undamaged by proton and electron radiation.
- 25% HBP(8Vi)POSS-Si(OEt)$_3$/75% Gelest DMS-S31 PDMS (Mw 26,000)
- 25% HBP(8Vi)POSS-Si(OEt)$_3$/75% Gelest PDS-1615, (14% Ph$_2$, Mw 1000) (shown in FIG. 6).
- 25% HBP-POSS(SiMe$_2$)SiMe$_2$OH/75% Gelest DMS-S31 PDMS (Mw 26,000)

Example 11B

Proton and Electron Radiation Testing

Adhesives samples sandwiched between two fused silica coupons (2×2 cm, JDSU uncoated 7980 FS, 6 mil) were tested against 2 MeV protons (fluence 1E13 p/cm$^2$, flux 1.8E8 p/s/cm$^2$, equivalent to 15 yrs in GEO) and 1 MeV electrons (fluence of 3E15 e/cm$^2$). Transmittance from 200 to 1800 nm was measured before and after exposure. These results are shown in Table 3 below.

TABLE 3

Results of 2 MeV proton tests, 1 MeV tests for a range of formulations.

| Formulation | Results |
| --- | --- |
| Polydilmethylsiloxane control | Proton- no damage |
|  | Electron- some damage 200-300 nm |
| 25% HBP-POSS(Me$_2$)—SiMe$_2$OH 75% DMS-S15 | Proton- no damage |
|  | Electron- no damage 200-300 nm |
| 25% HBP-POSS(Me$_2$)—SiMe$_2$OH 75% DMS-S12 | Proton- no damage |
|  | Electron-no damage 200-300 nm |

Example 12

Refractive Index Values

The refractive index measurements made for various hyperbranched polymers are summarized in Table 4 below. A Bausch and Lomb ABBE-3 L refractometer was used to make measurements at 23° C.

TABLE 4

Refractive indices of various hyperbranched polycarbosiloxanes and polysiloxanes

| Polymer | Refractive Index (23° C.) |
| --- | --- |
| HBP-POSS(8Vi)-(SiMe$_2$H)$_m$ | 1.4457 |
| HBP(8Vi)POSS-SiMe$_2$C$_2$H$_4$Si(OEt)$_3$ | 1.4438 |
| HBP-POSS(Me$_2$)—SiMe$_2$OH | 1.4215 |
| HBP-POSS(MePh)—SiMe$_2$OH | 1.4330 |
| HBP-POSS(Ph$_2$)—SiMe$_2$OH | 1.4616 |

For the HB polycarbosiloxanes, changing the terminal groups from SiH to Si(OEt)$_3$ has little effect on RI. For the polysiloxane series, RI increases from 1.42 to 1.46 with increasing phenyl content.

Example 13

Shelf Life Study

HBP-POSS(8Vi)-Si(OEt)$_3$ and Gelest PDS-1615 linear (14% SiPh$_2$, Mw 1000) were mixed. Bis(2 ethylhexanonate) tin (Gelest, in 10% w/w hexane solution) or dibutyltin dilaurate (Gelest, in 10% w/w hexane solution) was added at 2% weight based on total mass of polymers used. The homogenous solution was kept at RT and observed at regular intervals to determine if cure had taken place. Formulation mixtures were prepared in the presence of catalyst, but in the absence of solvent, in order to determine how long they could stand at RT before cure occurred. The formulation was studied against a PDMS control with both Sn(II) and Sn(IV) catalyst. It was found that shelf life could be controlled by varying the catalyst. If Sn(II) was used, the shelf-life was comparable to the PDMS control (cure after 1 day), but if Sn(IV) was used, the shelf life could be extended to 14 days.

Example 14

Out-Gassing

Samples were heated at 125° C. under high vacuum (<7×10$^{-3}$ Pa) for 24 hrs, and weight losses were measured, according to ASTM test E595-93 (Standard Test Method for Total Mass Loss and Collected Volatile Condensable Materials from Out-gassing in a Vacuum Environment, 1999). The masses of the samples before and after vacuum exposure were recorded, and percent mass loss was calculated using the mass of material lost and the initial sample mass. Duplicate experiments were carried out for each formulation, and the mean percent mass loss for a given formulation was quoted in Table 5 below.

TABLE 5

Out-gassing performance of materials at 125° C. under high vacuum for 24 hours.

| Formulation | Percent mass loss |
|---|---|
| 25% POSS-free HBP-Si(Me)Si(OEt)$_3$<br>75% DMS-S15 Polydimethylsiloxane | 0.9% |
| 10% HBP-POSS(8Vi)-Si(OEt)$_3$<br>90% DMS-S31 Polydimethylsiloxane | 1.3% |
| 25% HBP-POSS(MePh)—SiMe$_2$OH<br>75% DMS-S31 Polydimethylsiloxane | 1.3% |
| 25% HBP-POSS(8Vi)-Si(OEt)$_3$<br>75% DMS-S15 Polydimethylsiloxane | 1.0% |
| 10% HBP-POSS(8Vi)-Si(OEt)$_3$<br>90% DMS-S12 Polydimethylsiloxane | 0.1% |
| 25% HBP-POSS(Me$_2$)—SiMe$_2$OH<br>75% DMS-S15 Polydimethylsiloxane | 0.9% |
| 25% HBP-POSS(MePh)—SiMe$_2$OH<br>75% DMS-S15 Polydimethylsiloxane | 0.3% |
| 25% HBP-POSS(MePh)—SiMe$_2$OH<br>75% DMS-S12 Polydimethylsiloxane | 1.1% |
| Polydimethylsiloxane control | 1.4% |

Example 15

Preparation of Transparent Nano-reinforced Coatings

HBP(8SiH)-POSS-Si(OEt)2-vinyl 1,3-Divinyltetraethoxydisiloxane (18.02 g, 58.8 mmol) was weighed into a round-bottomed flask equipped with a cooling condenser. Karstedt's catalyst (0.02 g, ~2% platinum divinyhetramethyl-disiloxane complex in xylene) was added. The solution was stirred for 10 mins under nitrogen. Octasilane POSS (2.0 g, 1.96 mmol) in THF (20 mL) was added into the flask. The mixture was initially stirred at RT for 1 hr and then heated in an oil bath at 50° C. for 16 hrs. Then the reaction was heated at 80° C. for 24 hrs, followed by heating at 100° C. for an additional 24 hrs. THF was removed using a rotary evaporator and the resulting viscous oil was washed with anhydrous acetonitrile (5×20 mL) and dried under vacuum overnight to yield 4 g of colorless oil. Its spectra are:

IR (thin film): ν (cm$^{-1}$) 3040 (CH$_2$=CH), 2974, 2926, 2886, 2736 (CH$_3$ and CH$_2$, sym and asym), 1600, 1483, 1443, 1407, 1391, 1366, 1295, 1254 (SiCH$_3$), 1168, 1103 (SiOSi), 1009, 961, 844 (SiCH$_3$), 789 (SiOSi).

$^1$H NMR (CDCl$_3$): δ (ppm) 0.14 (SiCH$_3$), 0.63-0.66 (SiCH$_2$), 1.21-1.24 (OCH$_2$CH$_3$), 3.82-3.86 (OCH$_2$), 5.93-6.11 (CH=CH$_2$).

$^{29}$Si NMR (CDCl$_3$): δ (ppm) −104.6 (SiO$_4$), −61.7 (OSi(OEt)$_2$CH=CH$_2$), −47.8 (OSi(OEt)$_2$CH$_2$), 17.8 (OSiMe$_2$CH$_2$).

SEC (THF): Mw=133,000, Mn=16,000, polydispersity=8.3.

DSC (10° C. min$^{-1}$, nitrogen) −51° C.

TGA (10° C. min$^{-1}$, nitrogen), 2% mass loss at 350° C.

Refractive index 1.4464 at 23° C.

Tin-cured 25% HBP(8SiH)POSS[Si(OEt)$_2$]$_2$Vi/75% silanol-terminated polydimethylsiloxanes formulations gave robust coatings with excellent transmission.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. A POSS polymer compound of formula I $$[A_x]_p[B_y]_q \qquad \text{Formula I}$$

wherein:

A$_x$ is a POSS entity including closed-caged T8, T10, or T12 or an open-cage T8, T10, or T12 or another non-POSS monomer, having x number of A-type functional groups selected from hydridosilyl (Si—H), vinyl, hydroxyl or alkoxysilyl, with all functionality being the same for a given monomer;

x is an integer of 2 or more;

p is an integer of 2 or more; and

B$_y$ is a POSS entity including closed-caged T8, T10, or T12 or an open-cage T8, T10, or T12, or another non-POSS monomer, having y number of B-type functional groups that are chosen to react with the A-type functional groups and are selected from vinyl, hydridosilyl (Si—H), alkoxysilyl or hydroxyl, with all functionality being the same for a given monomer;

y is an integer of 3 or more;

q is an integer of 2 or more; and when present, the non-POSS monomer is H(SiR$_2$O)$_m$SiR$_2$H, vinyl-(SiR$_2$O)$_m$SiR$_2$-vinyl, Si(OSiR$_2$H)$_4$, HSiR$_2$CH$_2$CH$_2$SiR$_2$H, H(Si(OR)$_2$O)$_m$Si(OR)$_2$H, or vinyl(Si(OR)$_2$O)$_m$Si(OR)$_2$vinyl, where R is C$_1$-C$_5$ alkyl or C$_6$-C$_{14}$ aryl, and m is 1 or more;

provided that if A and B are both POSS entities, then x does not equal y; and provided that if A and B are both POSS entities, they are not identical entities; and provided that one of A or B must be a POSS entity; and wherein the polymer contains curable groups for further reaction, which curable groups are either initially present or have been added by a capping agent.

2. The compound of claim 1 wherein x is an integer from 2 to 11.

3. The compound of claim 1 wherein y is 3 to 12.

4. The compound of claim 1 wherein the POSS is substituted with one or more of carbosiloxane, siloxane, ether or alkyl groups.

5. The compound of claim 1 where B is a difunctional, trifunctional or tetrafunctional organosilicon compound.

6. The compound of claim 1 wherein R is methyl or phenyl.

7. The compound of claim 1 wherein the POSS polymer is a polycarbosiloxane containing POSS depicted by Formula IA Formula IA HBP-(8Vi)POSS-SiMe$_2$C$_2$H$_4$Si(OR)$_3$ wherein: n is 2 to 1000, and R is C$_1$-C$_{100}$ alkyl.

8. The compound of claim 1 wherein the POSS polymer is a HB polysiloxane containing POSS depicted by Formula IB Formula IB Abbreviated as: HBP-POSS(SiR$^1$R$^2$)-SiMe$_2$OH wherein: n is 2 to 1000, and R$^1$ and R$^2$ are independently C$_1$-C$_{100}$ alkyl or C$_6$-C$_{20}$ aryl.

9. A method for using a compound of Formula I as defined in claim 1 comprising reacting the polymer with curable end-groups having SiOR or SiOH, where R is defined as in claim 1, and curing the polymer by condensation reaction, with or without a catalyst.

10. The method of claim 9 wherein the functionalized polymer is tested for transmission of light or UV radiation after coating a glass plate or forming a film on a glass plate with functionalized polymer, or tested by forming an adhesive having the functionalized polymer in a layer sandwiched between at least 2 glass plates, or tested after proton and electron radiation of the functionalized polymer sandwiched between at least 2 glass plates, or tested for its elastomeric properties having the functionalized polymer, or tested for refractive index of transmission through the functionalized polymer, or tested under vacuum for mass loss of out-gassing of the functionalized polymer.

11. A method for crosslinking a polymer of Formula I as defined in claim 1 comprising functionalizing the polymer of Formula I with curable end-groups having SiOH, SiOR, SiH, or SiCHCH$_2$ where R is defined as in claim 1, and curing with linear polymers containing complimentary functionality, with or without a catalyst.

12. The method of claim 11 wherein the crosslinked polymer is tested for transmission of light or UV radiation after coating a glass plate or forming a film on a glass plate with the crosslinked polymer, or tested by forming an, adhesive having the crosslinked polymer in a layer sandwiched between at least 2 glass plates, or tested after proton and electron radiation of the crosslinked polymer sandwiched between at least 2 glass plates, or tested for its elastomeric properties having the crosslinked polymer.

13. A process for preparing a hyperbranched polymer comprising reacting:

a difunctional or polyfunctional monomer A$_x$ (a POSS entity including closed-caged T8, T10, or T12 or an open-cage T8, T10, or T12 or another non-POSS monomer, having x number of A-type functional groups, where the A-type functional groups are hydridosilyl (Si—H), vinyl, hydroxyl, chlorosilyl, or alkoxysilyl, with all functionality being the same for a given monomer, and x is an integer of 2 or more) with a difunctional or polyfunctional monomer B$_y$ (a POSS entity including closed-caged T8, T10, or T12 or an open-cage T8, T10, or T12 or another non-POSS monomer, having y number of B-type functional groups, where B-type functional groups are chosen to react with the A-type functional groups and are vinyl, hydridosilyl (Si—H) alkoxysilyl, chlorosilyl, or hydroxyl, with all functionality being the same for a given monomer, and y is an integer of 3 or more), which reaction product contains curable end-groups for further reaction, which curable end groups are either initially present in the reaction product or have been added by a capping agent, and when present, the non-POSS monomer is H(SiR$_2$O)$_m$SiR$_2$H, vinyl-(SiR$_2$O)$_m$SiR$_2$-vinyl, Si(OSiR$_2$H)$_4$, $HSiR_2CH_2CH_2SiR_2H$, $H(Si(OR)_2O)_mSi(OR)_2H$, or $vinyl(Si(OR)_2O)_mSi(OR)_2vinyl$, where R is $C_1$-$C_5$ alkyl or $C_6$-$C_{14}$ aryl, and m is 1 or more; and provided that if $A_x$ and $B_y$ are both POSS entities, then x does not equal y; and provided that if $A_x$ and $B_y$ are both POSS entities, they are not identical entities; and provided that one of $A_x$ or $B_y$ must be a POSS entity; and the resulting polymer has at least two repeat units;

the process uses a catalyst (such as hydrosilylation catalysts when vinyl and hydridosilyl functional groups are being reacted, or with or without condensation catalysts when alkoxysilyl and/or chlorosilyl and/or hydroxyl functional groups are being reacted), optionally in a solvent capable of dissolving the monomers under the reaction conditions, with the monomers being mixed in a ratio containing one of the functional groups in sufficient excess so as not to produce a gel, at temperatures appropriate for the reaction, and after completion of the reaction removing residual unreacted monomers and any solvent, thereby providing the polymer product, and optionally, further reacting the polymer with a capping agent to provide curable functional groups if not already present.

\* \* \* \* \*